United States Patent [19]
Smith

[11] 4,328,532
[45] May 4, 1982

[54] AIRCRAFT INSTRUMENT LIGHTING FIXTURE

[75] Inventor: Richard A. Smith, Urbana, Ohio

[73] Assignee: Midland-Ross Corporation, Cleveland, Ohio

[21] Appl. No.: 221,066

[22] Filed: Dec. 29, 1980

[51] Int. Cl.³ .............................................. F21V 9/14
[52] U.S. Cl. ...................................... 362/19; 362/29; 362/30; 362/62; 362/216; 362/290
[58] Field of Search ...................... 362/23, 29, 28, 30, 362/19, 216, 62, 290

[56] References Cited

U.S. PATENT DOCUMENTS 3,320,412  5/1967  Howland .............................. 362/28

*Primary Examiner*—Stephen J. Lechert, Jr.
*Attorney, Agent, or Firm*—Harlan E. Hummer

[57] ABSTRACT

An aircraft instrument lighting fixture is described as having a bezel top or covering for the instrument. The bezel top has a cylindrical opening through which the face or dial of the instrument can be viewed, and an inner cylindrical wall which is adjacent the opening and around which is located an electroluminescent lamp which, in turn, is covered by a micro-louver type material that is designed to prevent an observer of the instrument from seeing the light ring created by the electroluminescent lamp. A film of light polarizing material is placed between the electroluminescent lamp and the louver material to eliminate any objectionable reflection and glare normally created when unpolarized light strikes the instrument.

7 Claims, 4 Drawing Figures

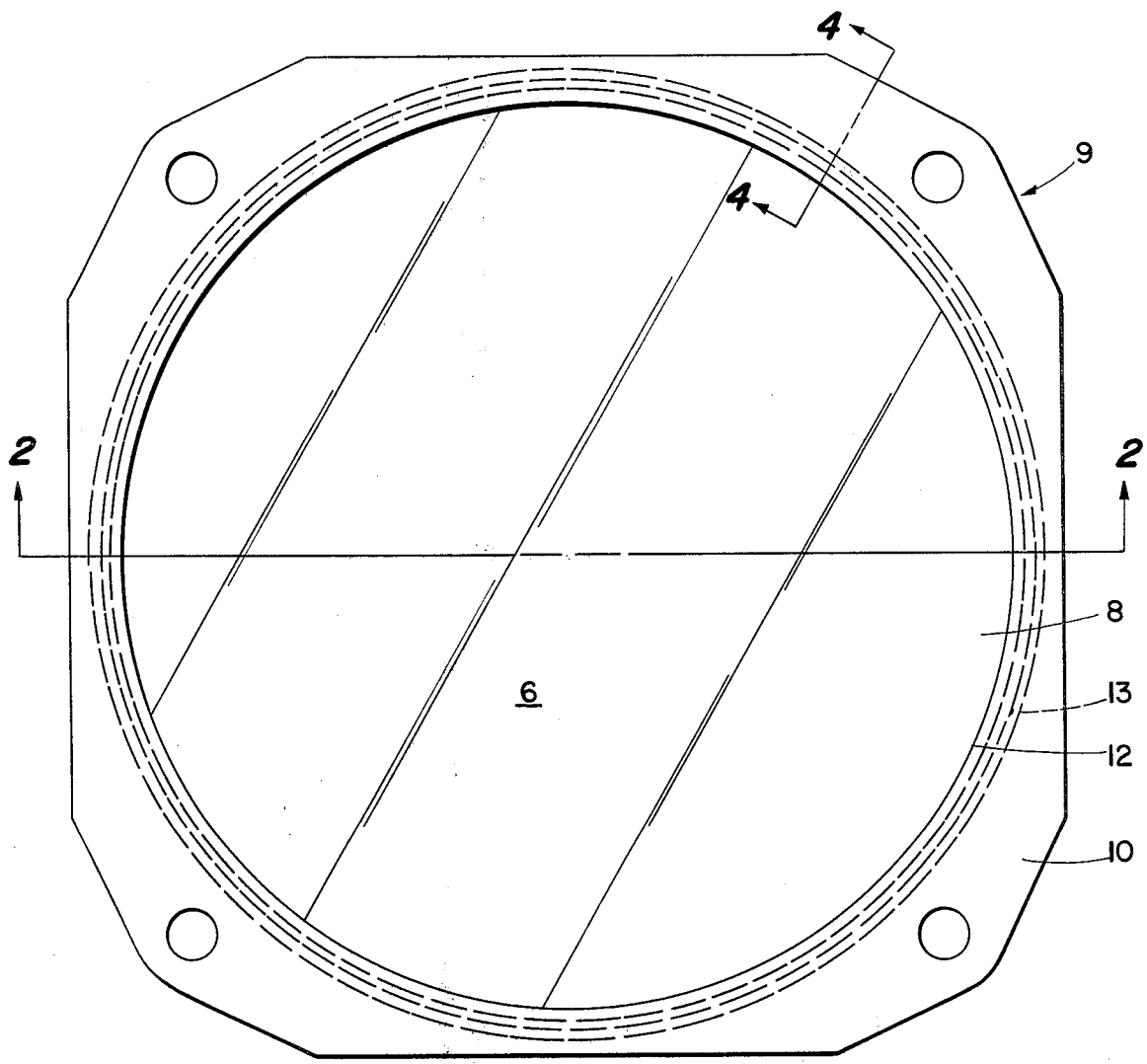
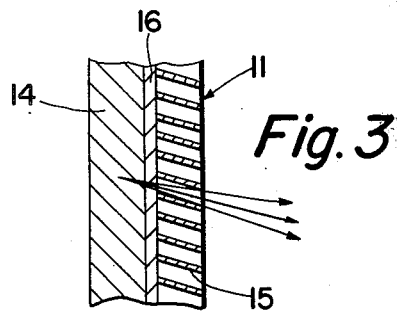
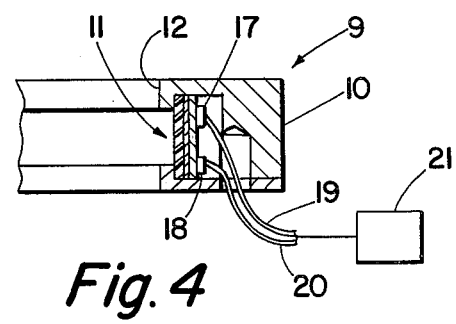
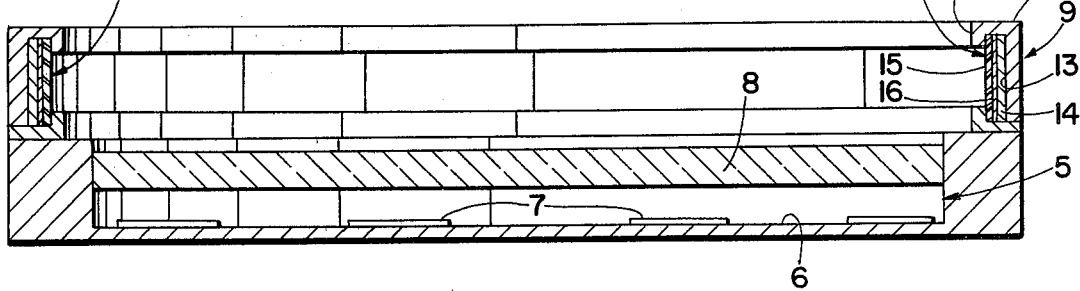

AIRCRAFT INSTRUMENT LIGHTING FIXTURE

BACKGROUND OF THE INVENTION

The invention is broadly suited for lighting any face or dial requiring such light, and especially instruments found on the instrument panel of an aircraft. The invention is even more aptly designed for military aircraft, e.g. helicopters, which are used for night flying by pilots wearing night vision goggles.

Eyebrow lighting is one method presently used for illuminating the faces or dials of instruments on military helicopters, such lighting so-called because a plurality of small incandescent lamps are positioned only around the vertically uppermost perimeter of each instrument. Instruments using such incandescent lighting have been found to be unreadable by pilots wearing night vision goggles, because of the non-uniformity of light which results when the intensity of the incandescent lamps is reduced to a low enough level to be used with night vision goggles which amplify and enhance low level lighting thousands of times. Moreover, it has been found that such lighting produces undesirable reflections within the canopy of the aircraft.

Other instrument installations have employed light reflecting wedges to direct light across the faces of the instruments. The source of light used, however, are incandescent lamps which produce undesirable low intensity lighting, as previously indicated. The invention is directed to the provision of a lighting fixture which is especially designed to produce improved illumination with reduced glare at low intensity levels of light.

Briefly stated, the invention is in a lighting fixture which is mounted on an instrument having a face or dial which is desired to be illuminated. The fixture comprises, a housing having a centrally disposed opening extending therethrough, and an inner cylindrical wall which is adjacent the opening, being spaced slightly outwardly therefrom, and around which is located an electroluminescent lamp. A cylindrical layer of micro-louver type material is placed over the electroluminescent (EL) lamp to prevent an observer of the instrument from seeing the light ring that is created around the face of the instrument by the EL lamp and to eliminate the undesired reflections within the aircraft canopy. A film is placed over the EL lamp between the lamp and louver material to polarize the light emitting from the lamp to eliminate the reflection of light from the glass of the instrument, thereby reducing glare from the instrument.

It has been found that the lighting fixture of the invention provides highly improved and uniform illumination of the face of the instrument. Further, the lighting fixture can be operated at a high enough intensity for direct viewing, or at a sufficiently low intensity for satisfactory viewing through night vision goggles. The electroluminescent lamps produce little, if any, infrared energy which is characteristic of incandescent lamps and which can create too much spectral energy in some areas to reduce the resolution potential of the night vision goggles.

DESCRIPTION OF THE DRAWING

The following description of the invention will be better understood by having reference to the accompanying drawing, wherein:

FIG. 1 is a plan view of an aircraft instrument and a lighting fixture which is made in accordance with the invention and designed to illuminate the face or dial of the instrument which is part of an instrument panel of an aircraft;

FIG. 2 is a section of the instrument and lighting fixture, as viewed from the line 2—2 of FIG. 1;

FIG. 3 is an enlarged section of the various components of the lighting device of the lighting fixture; and FIG. 4 is a section of the lighting fixture only, as viewed from the line 4—4 of FIG. 1.

ENVIRONMENT OF THE INVENTION

With general reference to the drawing for like parts and more particular reference to FIGS. 1 and 2, there is shown an instrument 5 which is typical of a number of instruments that appear on an instrument panel of an aircraft. The instrument 5 essentially comprises a cylindrical face or dial 6 which is provided with any suitable indicia 7 and which is covered by any appropriate transparent glass material 8.

THE INVENTION

With particular reference to FIGS. 2-4, there is shown a lighting fixture 9 which is mounted atop the instrument 5 and essentially comprises a bezel-type housing 10 which holds a lighting device 11 that is used to illuminate the face 6 of the instrument 5.

The bezel housing 10 has a centrally disposed circular opening 12 which extends longitudinally through the housing 10 and through which the face 6 of the instrument 5 can be viewed. The bezel housing 10 has an inner cylindrical wall or periphery 13 which is recessed from the opening 12 inwardly of the housing 11, so that an annular overhang is provided for covering the inner wall 13 of the housing 10 and adjacent lighting device 11.

The lighting device 11 comprises, (I) a cylindrically-shaped electroluminescent (EL) lamp 14 which is located in abutting relation against the inner wall 13 of the bezel housing 10, (II) a cylindrical layer of any suitable micro-louver type material 15 which covers the EL lamp 14 and is used to direct or deflect the light rays from the lamp in the direction of the instrument face 6, to more uniformly illuminate the face 6 and prevent the viewer of the instrument from seeing the ring of light that is created by the EL lamp around the instrument face 6 during operation of the lamp, and (III) a cylindrical film of any appropriate light polarizing material 16, which is positioned between the EL lamp 14 and louver material 15 to cover the EL lamp 14 and polarize light emitting from the lamp, to eliminate the reflection of light bouncing off the glass cover 8 of the instrument 5, thereby reducing the glare normally occasioned when unpolarized light strikes the instrument 5.

The EL lamp 14, as best seen in FIG. 4, has a pair of electrical contacts 17 and 18 to which wire leads 19, 20 are fastened and extend therefrom for connection to any suitable source 21 of electrical power that is necessary to operate the EL lamp 14.

Thus, there has been provided a lighting fixture which is especially useful in the provision of low intensity instrument lighting beneficial to military pilots wearing night vision goggles. The lighting fixture provides highly improved uniformity in the illumination of the face of the instrument, as well as improved reduction in the glare and reflection of light from the instrument during operation of the lighting fixture.

What is claimed is:

1. A lighting fixture used to illuminate the face or dial of an instrument, comprising:
   (a) a housing mountable atop the instrument and having, (i) a centrally disposed opening through which the face of the instrument can be viewed, and (ii) a continuous inner wall spaced outwardly from the opening, relative to the center axis of the opening;
   (b) an electroluminescent lamp located adjacent the inner wall of the housing between the wall and opening and being at least partially longitudinally coextensive with the wall; and
   (c) means covering the electroluminescent lamp for preventing a viewer of the instrument face from seeing the ring of light created around the face of the instrument by the electroluminescent lamp during operation, and for polarizing light emitting from the lamp.

2. The light fixture of claim 1, wherein the inner wall of the housing is cylindrical, and the electroluminescent lamp is matingly cylindrically shaped to abut the inner cylindrical wall.

3. The lighting fixture of claim 2, wherein the means includes a cylindrical layer of a micro-louver type material which directs light rays from the lamp in the direction of the face of the instrument.

4. The light fixture of claim 2, wherein the means includes a cylindrical layer of light polarizing material.

5. The light fixture of claim 2, wherein the means includes successive cylindrical layers, starting from the lamp, of a light polarizing material and a micro-louver type material for directing rays of light from the lamp in the direction of the face of the instrument.

6. The light fixture of claim 5, which includes an annular overhang extending from the inner wall into the opening to partially cover the assembly of the lamp and layers of polarizing and louver-type materials.

7. The light fixture of claim 6, which includes means for connecting the lamp to a source of electrical energy suitable to operate the lamp.

* * * * *